(12) United States Patent
Campani

(10) Patent No.: US 7,984,523 B2
(45) Date of Patent: Jul. 26, 2011

(54) OPERABLE STABILIZATION DEVICE FOR A RESCUE STRETCHER AND METHOD THEREOF

(75) Inventor: Nicola Campani, Vezzano sul Crostolo (IT)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 12/596,061

(22) PCT Filed: Apr. 17, 2008

(86) PCT No.: PCT/US2008/060597
§ 371 (c)(1),
(2), (4) Date: Jun. 17, 2010

(87) PCT Pub. No.: WO2008/131081
PCT Pub. Date: Oct. 30, 2008

(65) Prior Publication Data
US 2010/0263126 A1    Oct. 21, 2010

(30) Foreign Application Priority Data
Apr. 19, 2007 (IT) .............................. BO2007A0293

(51) Int. Cl.
*A61G 1/04* (2006.01)
(52) U.S. Cl. .............................................. 5/626; 5/625

(58) Field of Classification Search ............... 5/625–629; 244/137.2, 138 R; 114/102.13, 272, 39.12; 280/213, 810
See application file for complete search history.

(56) References Cited

U.S. PATENT DOCUMENTS

| | | | | |
|---|---|---|---|---|
| 2,738,939 A * | 3/1956 | Johnson | ...................... | 244/137.2 |
| 2,969,210 A * | 1/1961 | Richardson et al. | ........ | 244/137.2 |
| 3,343,189 A * | 9/1967 | Pollard et al. | .................... | 441/83 |
| 3,609,778 A * | 10/1971 | Zeiner | ............... | 5/628 |
| 4,564,161 A * | 1/1986 | Frye | .......................... | 244/137.2 |
| 5,344,203 A * | 9/1994 | Tollenaere | .................... | 294/68.1 |
| 5,732,642 A * | 3/1998 | DeSilva | ................... | 114/102.13 |
| 2009/0094743 A1 * | 4/2009 | Tanaka et al. | ................ | 5/81.1 T |

* cited by examiner

*Primary Examiner* — Michael Trettel
(74) *Attorney, Agent, or Firm* — Dinsmore & Shohl LLP

(57) ABSTRACT

An operable stabilization device for a rescue stretcher and method thereof are disclosed. The present invention is especially but not exclusively used in an aircraft rescue of an injured person that is carried in a rescue stretcher suspended from a helicopter by a cord. The stabilization device is configured to adjust direction of a downward airflow from a main rotor of the helicopter to control rotation of the rescue stretcher, and includes a manually operable stabilization sail configured to accept the airflow, an airflow passageway configured to allow and direct the airflow through the stabilization sail and an airflow regulator configured to restrict the amount of airflow being accepted by the airflow passageway.

16 Claims, 3 Drawing Sheets

US 7,984,523 B2

OPERABLE STABILIZATION DEVICE FOR A RESCUE STRETCHER AND METHOD THEREOF

The present invention relates generally to rescue stretchers, in particular to an operable stabilization device for a rescue stretcher and method thereof, and especially but not exclusively to a helicopter air rescue of an injured person, wherein the stabilization device is operable to accept and adjust direction of a downward airflow from a main rotor of the helicopter to control rotation thereof.

Stretchers are used to support and carry an injured person in rescue operations. Generally when performing a helicopter air rescue, a stretcher is lowered from a cable winch to an ordinarily inaccessible injured person. The stretcher is typically accompanied by an air rescue worker in its decent. After the air rescue worker secures the injured person to the stretcher, the stretcher is then raised by the cable winch back into the helicopter. While the stretcher, the injured person and the air rescue personnel are rising towards the helicopter, they are battered by a downward airflow created by the main rotor of the helicopter. This downward airflow causes the stretcher to rotate laterally at uncontrollable speeds. This rotation creates an unsafe environment for both the injured person and the rescue worker, which could result in further injury. Ordinarily a second cable is required to be coupled to the stretcher to prevent or combat the rotational spin of the stretcher. The second cable can either be held by a second air rescue worker or directly secured to a point of land. A disadvantage of using the second cable is that it may be accidentally released by the rescue worker or there may not be an appropriate place of land for securement. Additionally, the second cable can become tangled in trees or other elements and ultimately compromise the rescue It is against the above background that the present invention provides an operable stabilization device for a rescue stretcher which can be operated by a rescue worker on the stretcher. The rescue worker can independently adjust the stabilization device to avoid the unwanted rotational spin of the rescue stretcher caused such as, for example, by downward airflow of a main rotor of a helicopter. Additionally, the stabilization device can be stored compactly when not in use.

One exemplary embodiment of the present invention is a operable stabilization device for controlling a downward airflow on a rescue stretcher comprising a manually operable stabilization sail, wherein the stabilization sail has a airflow passageway and an airflow regulator. The airflow passageway is configured to accept the downward airflow, while the airflow regulator is configured to restrict the amount of downward airflow accepted by the airflow passageway. In another embodiment, the stabilization sail further comprises a first curved side piece and second curved side piece coupled to a center portion. In still another embodiment, the stabilization sail is coupled to a handle. In yet another embodiment, the stabilization sail comprises a wing shape. In another embodiment, the stabilization sail is substantially rectangular in shape. In still another embodiment, the airflow passageway has a circular opening. In yet another embodiment, the airflow passageway is centrally located on the stabilization sail. In another embodiment, the airflow regulator is at least partially overlapping the airflow passageway. In still another embodiment, the airflow regulator is rectangular in shape. In one more embodiment, the stabilization sail is coupled to the side of a helicopter stretcher. In another embodiment, the stabilization device further includes a pocket for self storage of the stabilization. In still another embodiment, the stabilization device further includes a stretch Another exemplary embodiment of the present invention includes a method to stabilize a rescue stretcher suspended from a helicopter by a cord, the method comprising providing a manually operable stabilization device and adjusting the stabilization device to counter balance a downward airflow created by the helicopter to control rotation of the rescue stretcher about the cord. In another embodiment, the adjusting of the method includes raising a handle of the stabilization device to move the rescue stretcher clockwise and lowering the handle of the stabilization device to move the rescue stretcher counterclockwise.

These and other features and advantages of the invention will be more fully understood from the following description of various embodiments of the invention taken together with the accompanying drawings.

The present invention is illustrated by way of example and not limitation in the accompanying figures, in which like references indicate similar elements, and in which.

Figure 5:
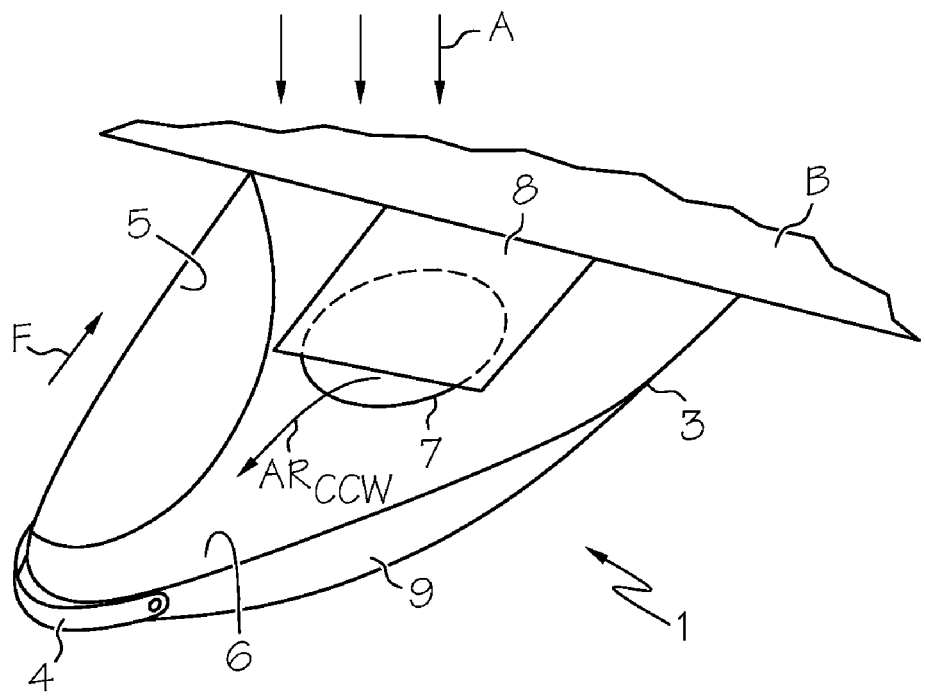
Figure 6:
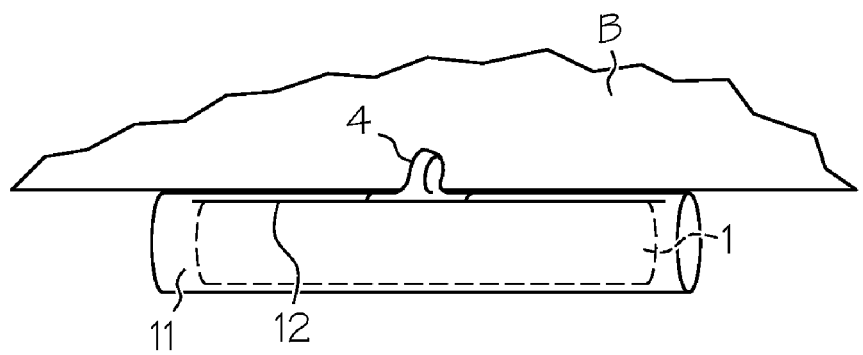

FIG. 5 is an elevated perspective view of a stabilization device according to the present invention being used in a lowered position to accept and adjust direction of a downward airflow to control rotation of an attached rescue stretcher; and FIG. 6 is a schematic side view of a pocket for containment of a stabilization device according to the present invention, the pocket being provided attached to a rescue stretcher for ease of deployment and storage of the stabilization device.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

Figure 1:
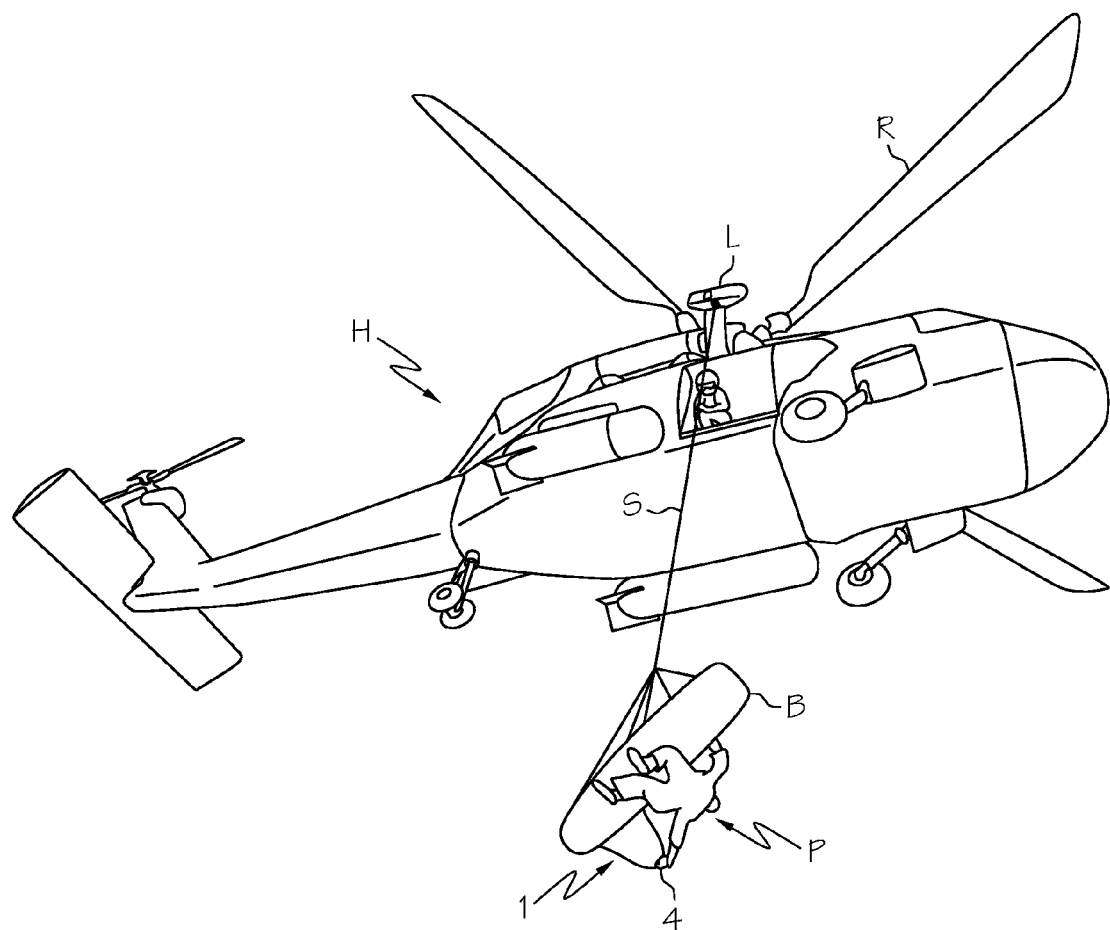
FIG. 1 is a schematic view showing a bottom of a stabilization device according to the present invention which is extended from a rescue stretcher suspended from a helicopter by a cord.

With reference first to FIG. 1, a bottom of a stabilization device according to the present invention and generally indicated by symbol 1 is shown. The stabilization device 1 in the illustrated embodiment is coupled to a rescue stretcher B, wherein the rescue stretcher B is lowered and raised by a cable or cord S attached to a winch L of a helicopter H. Although the stabilization device 1 is illustrated as being connected to a side of the rescue stretcher B adjacent a head end thereof, the stabilization may also be conveniently be connected to the side of the rescue stretcher B adjust a foot end thereof. The stabilization device 1 is usually operated by a rescue worker P, but in extreme situations could be operated by an injured person (not shown) carried on the rescue stretcher B.

Figure 2:
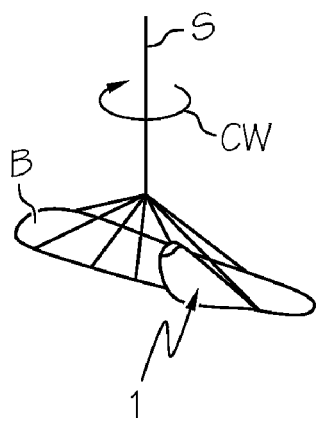
FIG. 2 is a schematic view of a stabilization sail of a stabilization device according to the present invention shown raised to rotate a rescue stretcher clockwise about an attached cord.
Figure 3:
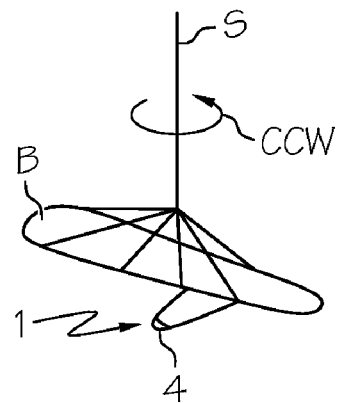
FIG. 3 is a schematic view of a stabilization sail of a stabilization device according to the present invention shown lowered to rotate a rescue stretcher counterclockwise about an attached cord.

FIGS. 2 and 3 display the rescue stretcher B being suspended by the cable or cord S. FIG. 2 displays the stabilization device 1 in an up or raised position, while FIG. 3 displays the stabilization device 1 in a down or lowered position. The rescue worker P is not presented in FIGS. 2 and 3 to avoid obstructing the view of the rescue stretcher B in reference to the stabilization device 1. When the stabilization device 1 is adjusted to the up or raised position the rescue stretcher B rotates clockwise about cord S, as indicated by arrow CW in FIG. 2. When the stabilization device 1 is adjusted to the down or lowered position the rescue stretcher B rotates counterclockwise about cord S, as indicated by arrow CCW in FIG. 3.

Figure 4:
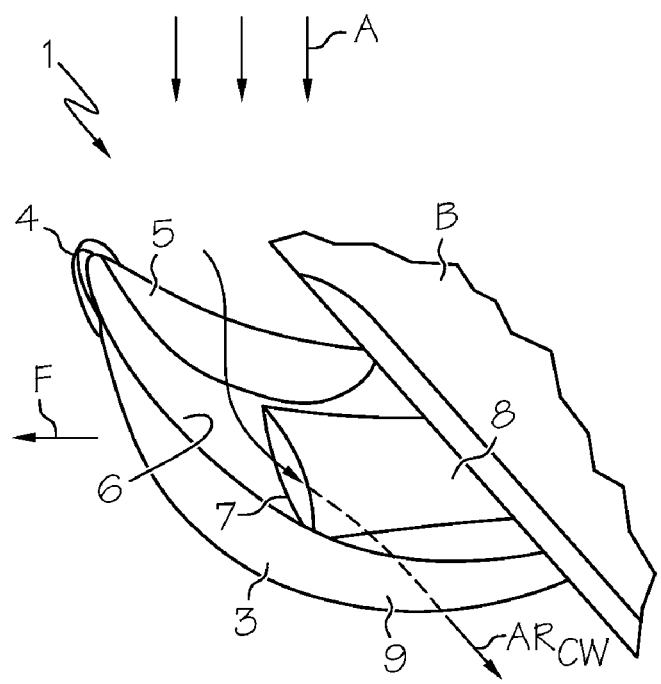
FIG. 4 is an elevated perspective view of a stabilization device according to the present invention being used in a raised position to accept and adjust direction of a downward airflow to control rotation of an attached rescue stretcher.

FIG. 4 is an elevated perspective view of the stabilization device 1 being used in the raised position to accept and adjust direction of a downward airflow A to control rotation of the attached rescue stretcher B. In the illustrated embodiment, the stabilization device 1 generally includes a manually operable stabilization sail 3, an airflow passage 7, and an airflow regulator 8. The stabilization sail 3 comprises a center piece 6, and two side pieces 5, 9. The stabilization device 1 should be made out of a flexible material, such as, for example, silk, nylon fabric, Kevlar, plastic, and combinations thereof. The side pieces 5, 9 of the stabilization device 1 in one embodiment are rounded or curved to capture more airflow.

As mentioned above, the stabilization device 1 illustrated by FIG. 4 is in the raised position accepting the downward airflow A, such as may be provided from a main rotor R of the helicopter H (FIG. 1). The downward airflow A contacts the stabilization sail 3 and a majority of the airflow A captured by the center piece 6 and side pieces 5, 9 is directed through the airflow passage 7 as indicated by arrow $AR_{CW}$. As the stabilization sail 3 directs air to the airflow passageway 7, an airflow regulator 8 overlapping the airflow passageway 7, controls the amount of air being accepted and directed through the airflow passageway 7. Controlling the amount of air flowing through the airflow passageway 7 thus permits the rescue worker P to control the magnitude of force used to counter the rotation of the rescue stretcher B caused by the downward airflow A.

As mentioned above, when the stabilization device 1 is in the up or raised position the rescue stretcher B rotates clockwise CW (FIG. 2). The airflow passageway 7 in one embodiment has a circular or oval shape, while the airflow regulator 8 in another embodiment has a substantially rectangular shape. In other embodiments, passageway 7 and regulator 8 may be other geometric shapes so long as the above described functions of each are provided. The stabilization device 1 in one embodiment also provides a handle 4, which the rescue worker P uses to adjust the stabilization device 1 either up or down to the raised or lowered positions, and out and in to deploy and stow, respectively, the stabilization device 1.

FIG. 5 is an elevated perspective view of the stabilization device 1 being used in the lowered position to accept and adjust direction of the downward airflow A to control rotation of the attached rescue stretcher B. In this embodiment, a majority of the downward airflow A captured by the stabilization device 1 flows over the airflow passageway 7, due to obstruction of airflow regulator 8, and across the center piece 6 as well as an airflow through the airflow passageway 7 in the opposite direction as indicated by arrow $AR_{CCW}$. This airflow $AR_{CCW}$ is due to the venturi effect on the sail 3 that decreases the pressure under the stretcher, thereby causing the rescue stretcher B to rotate counterclockwise (FIG. 3). It is to be appreciated that the flexibility of the stabilization device 1 allows the rescue worker P to easily adjust the position of the device 1 to counteract the downward airflow A received on the top of a rescue stretcher and causing it to rotate.

As illustrated in FIG. 6, the stabilization device 1 is coupled to the side of the stretcher B and provided in a pocket 11 for storage when not being used. The pocket 11 in one embodiment is made of a mesh material to allow airflow therethrough to minimize turbulences during the use of the stabilization sail 3. Although not required, the pocket 11 may have an opening 12 in which the handle 4 of the stabilization device 1 protrudes. Material such as Velcro type closure strips may be used to secure the pocket shut. In one embodiment, the pocket 11 and/or the stabilization device 1 at the end opposite the handle 4 is releasable coupled to the side of the rescue stretcher B.

While some of the alternative embodiments of the present invention have been discussed specifically; other embodiments will be apparent or relatively easily developed by those of ordinary skill in the art. Accordingly, the invention is intended to embrace all alternatives, modifications and variations that have been discussed herein, and others that fall within the broad scope of the claims.

The invention claimed is:

1. A stabilization device for controlling a downward airflow on a rescue stretcher comprising:
    a manually operable stabilization sail configured to accept the airflow;
    an airflow passageway configured to allow and direct the airflow through the stabilization sail; and
    an airflow regulator configured to restrict the amount of the airflow being accepted by the airflow passageway, wherein the stabilization sail is adjustable between a raised position and a lowered position to control rotation of the rescue stretcher, such that when coupled to the stabilization device:
    the rescue stretcher rotates in a clockwise direction in the raised position, and
    the rescue stretcher rotates in a counterclockwise direction in the lowered position.

2. The stabilization device according to claim 1 wherein the stabilization sail further comprises a first curved side piece and second curved side piece coupled to a center portion.

3. The stabilization device according to claim 1 wherein the stabilization sail is coupled to a handle.

4. The stabilization device according to claim 1 wherein the stabilization sail comprises a wing shape.

5. The stabilization device according to claim 1 where in the stabilization sail is substantially rectangular in shape.

6. The stabilization device according to claim 1 wherein the airflow passageway has a circular opening.

7. The stabilization device according to claim 1 wherein the airflow passageway is centrally located on the stabilization sail.

8. The stabilization device according to claim 1 wherein the airflow regulator is at least partially overlapping the airflow passageway.

9. The stabilization device according to claim 1 wherein the airflow regulator is rectangular in shape.

10. The stabilization device according to claim 1 wherein the stabilization sail is coupled to the side of a helicopter stretcher.

11. The stabilization device according to claim 1 further comprising a pocket for self storage of the stabilization device.

12. The stabilization device according to claim 1 further comprising:
    a stretcher attached to a cord; and
    the stabilization device coupled to the stretcher.

13. A method to stabilize a rescue stretcher suspended from a helicopter by a cord, the method comprising providing a manually operable stabilization device according to claim 1 and adjusting the stabilization device to counter balance a downward airflow created by the helicopter to control rotation of the rescue stretcher about the cord.

14. The method according to claim 13, wherein the adjusting comprises raising a handle of the stabilization device to the raised position to move the rescue stretcher counterclockwise and lowering the handle of the stabilization device to the lowered position to move the rescue stretcher clockwise.

15. A stabilization device for controlling a downward airflow on a rescue stretcher comprising:
   a manually operable stabilization sail configured to accept the airflow, wherein the stabilization sail comprises a first curved side piece and second curved side piece coupled to a center portion;
   an airflow passageway configured to allow and direct the airflow through the stabilization sail; and
   an airflow regulator configured to restrict the amount of the airflow being accepted by the airflow passageway.

16. A stabilization device for controlling a downward airflow on a rescue stretcher comprising:
   a manually operable stabilization sail configured to accept the airflow;
   an airflow passageway configured to allow and direct the airflow through the stabilization sail; and
   an airflow regulator configured to restrict the amount of the airflow being accepted by the airflow passageway, wherein the stabilization sail is coupled to the side of a helicopter stretcher.

* * * * *